Patented June 20, 1933

1,915,174

UNITED STATES PATENT OFFICE

HEINRICH WIELAND, OF MUNICH, GERMANY, ASSIGNOR TO C. H. BOEHRINGER SOHN AKTIENGESELLSCHAFT, OF NIEDER-INGELHEIM-ON-THE-RHINE, GERMANY, A CORPORATION OF GERMANY

PROCESS FOR THE SEPARATION OF THE OPTICALLY ACTIVE ISOMERS OF LOBELIA ALKALOIDS, THEIR DERIVATIVES, AND ALLIED COMPOUNDS

No Drawing. Original application filed June 24, 1929, Serial No. 373,467, and in Germany June 29, 1928. Divided and this application filed March 13, 1931. Serial No. 522,527.

This application is a division of the process described in my prior application, Ser. No. 373,467, for the Preparation of lobelia alkaloids, their derivatives, and allied compounds, which application was filed on June 24, 1929.

According to my aforesaid application it is possible in the case of compounds, which contain in a ring system, consisting of carbon atoms and one nitrogen atom, at least one side chain with an alcoholic hydroxyl group in the 2- or 6-position to the nitrogen atom, to convert one or both of the hydroxyl groups contained in the side chains into carbonyl groups by treatment with the usual oxidizing agents, such as permanganate or pyrolusite in dilute sulphuric acid.

In this way it is possible, for example to convert the lobelanidine contained as a comparatively inactive by-product in the mother liquors from the preparation of d,l-lobeline (lobelidine) and having the formula:

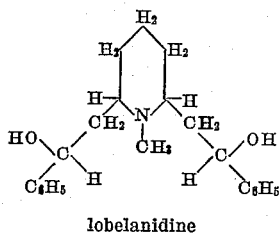

lobelanidine into valuable d,l-lobeline

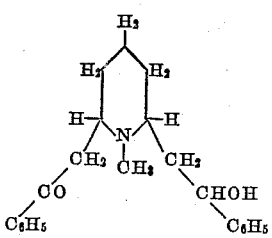

It is possible in general to convert in this way one or both of the side chain hydroxyl groups in compounds of the type

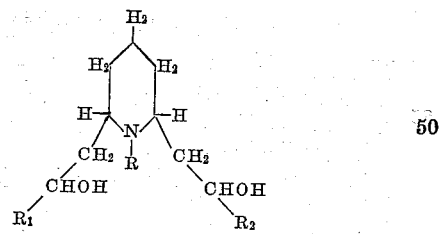

where R, R$_1$ and R$_2$ represent an alkyl or aralkyl residue or hydrogen, as well as in substitution products of such compounds, into carbonyl groups.

It has been found that such compounds obtained according to the process of my aforesaid prior application, which contain a carbonyl group in one side chain and a hydroxyl group attached to an asymmetric carbon atom in the other side chain, such as d,l-lobeline, d,l.nor-lobeline or their substitution products, can be resolved with the aid of suitable optically active acids, such as tartaric acid or with the aid of the salts of the said acids into their optically active components. Thus for example by causing neutral tartrates to react with salts of d,l-lobeline a mixture of varying composition, depending upon the working conditions, of tartrates of l-lobeline is obtained, from which pure l-lobeline is obtained by repeated recrystallization and separation of the base, whilst d,lobeline may be recovered from the mother liquors.

Example 5 gms. of lobelanidine are dissolved with stirring in 500 ccs. of about 5% sulphuric acid and treated with 1.4 gms. (theoretical quantity required=1.28 gms.) of freshly precipitated pyrolusite. After 4 to 5 hours the vigorously stirred solution becomes clear. It is then rendered alkaline with soda lye, the liberated base taken up in chloroform, the dried chloroform solution evaporated and the residue boiled out with ether. 1.5 gms. of lobelanidine remain behind as powder undissolved by the ether. The ethereal solution is concentrated and yields 1.8 gms. of crude d,l-lobeline of melting point 104–110° C. (about 80% of pure d,l-lobeline can be recovered therefrom).

10 gms. of the hydrochloride of the lobeline obtained in the manner described are dissolved in 20 ccs. of water and treated with the calculated quantity of 6.2 gms. of sodium tartrate dissolved in 10 ccs. of water. A light oil separates out and soon sets, particularly on seeding with the tartrate of l-lobeline. On recrystallizing long needles, melting at 70° C. consisting of the tartrate of l-lobeline and polyhedral crystal clusters having a melting point of 180° C., which presumably contain l-lobeline-sodium tartrate, are obtained side by side. A base of melting point 130–131° C. which consists of l-lobeline is obtained from both salts, and has $$[\alpha]_D = -38.5° \ (\pm 1°).$$

The substantially more readily soluble tartrate of d-lobeline may be recovered from the mother liquor.

What I claim is:—

1. A process which consists in resolving into their optically active compounds racemic compounds which, in a nucleus of the group consisting of piperidine and an N-alkylated piperidine, contain a $\beta$-hydroxy-$\beta$-phenethyl group in the 2-position to the nitrogen atom and a phenacyl group in the 6-position, with the aid of a member of the group consisting of optically active organic acids and salts of said organic acids.

2. A process which consists in resolving into their optically active components racemic compounds which in a piperidine nucleus contain a $\beta$-hydroxy-$\beta$-phenethyl group in the 2-position to the nitrogen atom and a phenacyl group in the 6-position with the aid of a substance chosen from the group consisting of tartartic acid and salts of tartaric acid.

3. A process which consists in resolving into their optically active components racemic compounds which in an N-alkylated piperidine nucleus contain a $\beta$-hydroxy-$\beta$-phenethyl group in the 2-position to the nitrogen atom and a phenacyl group in the 6-position, with the aid of a member of the group consisting of optically active organic acids, and salts of said optically active organic acids.

4. A process which consists in resolving into its optically active components the racemic 2-($\beta$-hydroxy-$\beta$-phenethyl)-6-phenacylpiperidine (d,l-nor-lobeline) with the aid of a substance chosen from the group consisting of optically active organic acids and salts of said optically active organic acids.

5. A process which consists in resolving into its optically active components racemic 2-($\beta$-hydroxy-$\beta$-phenethyl) 6-phenacyl-N-methyl-piperidine (d,l-lobeline) with the aid of a substance chosen from the group consisting of optically active organic acids and salts of said organic acids.

6. A process which consists in resolving into its optically active components the racemic 2 ($\beta$-hydroxy-$\beta$-phenethyl)-6-phenacyl-N-methyl-piperidine (d,l-lobeline) with the aid of a substance chosen from the group consisting of optically active tartaric acid and salts of said optically active tartaric acid.

7. A process which consists in resolving into their optically active components racemic compounds which in a piperidine nucleus contain a $\beta$-hydroxy-$\beta$-phenethyl group in the 2-position to the nitrogen atom and a phenacyl group in the 6-position, with the aid of a salt of an optically active acid.

In testimony whereof I affix my signature.

H. WIELAND.